(12) United States Patent  
Wheelwright et al.

(10) Patent No.: US 10,955,672 B1  
(45) Date of Patent: Mar. 23, 2021

(54) OPTICAL ASSEMBLY WITH SWITCHABLE WAVEPLATES

(71) Applicant: Facebook Technologies, LLC, Menlo Park, CA (US)

(72) Inventors: Brian Wheelwright, Sammamish, WA (US); Ying Geng, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/140,985

(22) Filed: Sep. 25, 2018

(51) Int. Cl.
 *G02B 27/01* (2006.01)
 *G02B 5/30* (2006.01)

(52) U.S. Cl.
 CPC ....... *G02B 27/0172* (2013.01); *G02B 5/3025* (2013.01)

(58) Field of Classification Search
 CPC . G02B 27/283; G02B 27/0172; G02B 5/3025
 See application file for complete search history.

(56) References Cited

U.S. PATENT DOCUMENTS

| 2017/0227773 A1* | 8/2017 | Aksit | G02B 27/0172 |
| 2018/0101020 A1* | 4/2018 | Gollier | G02B 27/283 |
| 2018/0217377 A1* | 8/2018 | Lam | G02B 27/0172 |

* cited by examiner

*Primary Examiner* — Abdul-Samad A Adediran
(74) *Attorney, Agent, or Firm* — Freestone Intellectual Property Law PLLC; Aaron J. Visbeek

(57) ABSTRACT

An optical assembly includes at least one switchable waveplate and a reflective polarizer layer. The reflective polarizer layer is configured to pass a first polarization orientation of display light and reflect a second polarization orientation orthogonal to the first polarization orientation. The optical assembly provides a first effective focal length when the switchable waveplate is switched to a first retardance value and the optical assembly provides a second effective focal length when the switchable waveplate is switched to a second retardance value.

20 Claims, 19 Drawing Sheets

OPTICAL ASSEMBLY WITH SWITCHABLE WAVEPLATES

TECHNICAL FIELD

This disclosure relates generally to optics, and in particular to lenses.

BACKGROUND INFORMATION

High quality optical assemblies that may include a combination of lenses, filters, and/or polarizers are used extensively in both commercial and consumer products. An optical assembly may be utilized to focus images from a display for a user of a head mounted display (HMD) in the context of Virtual Reality (VR), Augmented Reality (AR), and/or Mixed Reality (MR). In these and other contexts, it may be desirable to provide high-resolution images with a wide field of view (FOV).

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
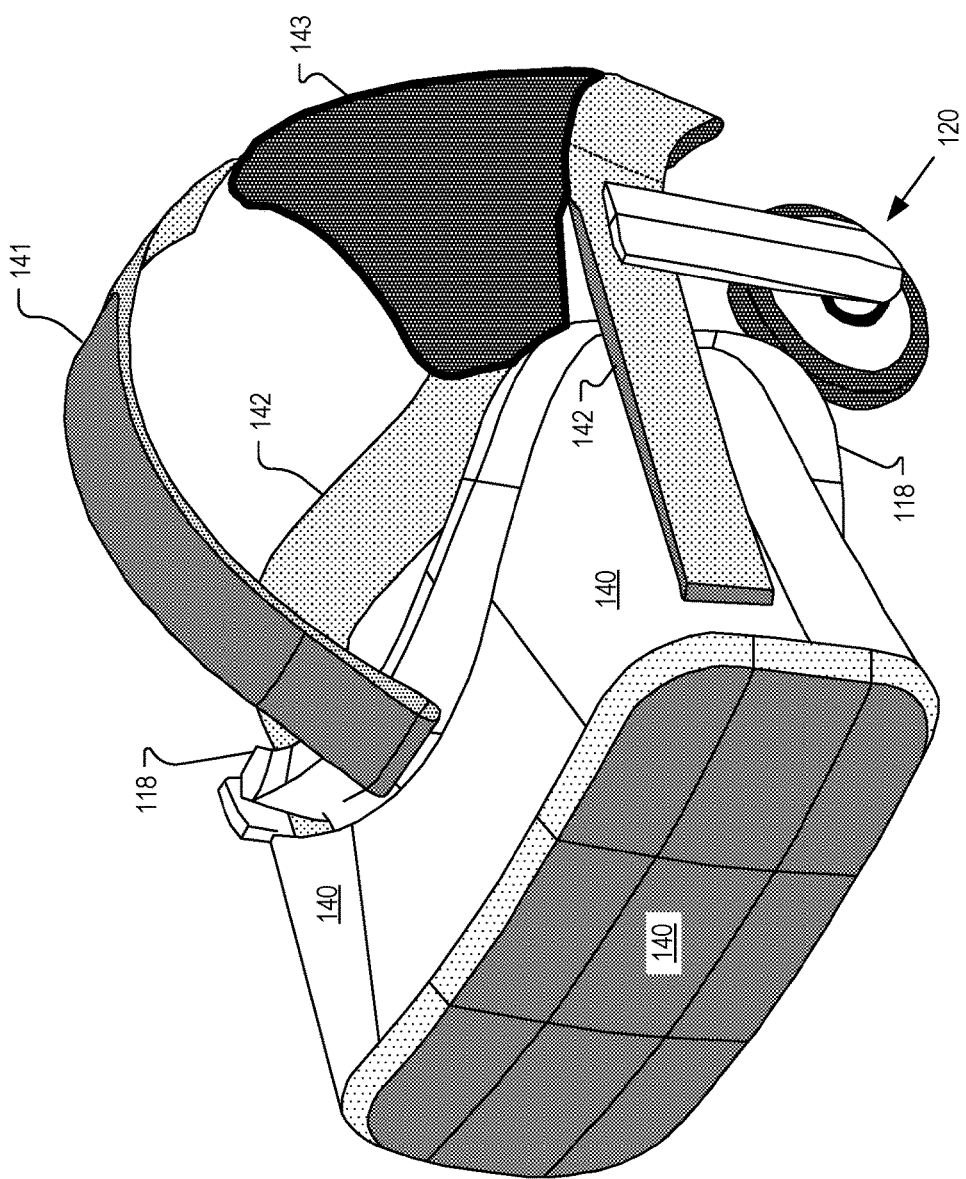
FIG. 1 illustrates an example head mounted display (HMD) that may include an optical assembly having switchable waveplates, in accordance with an embodiment of the disclosure.

Embodiments of an optical assembly with a dynamic Field of View (FOV) using one or more switchable waveplates are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the disclosure include an optical assembly having one or more switchable waveplates that allows for an electronically selectable effective focal length for the optical assembly and corresponding Field of View (FOV). At least one reflective polarizer is also included in the optical assembly. Selecting a retardance value (e.g. $0\lambda$ or $\lambda/2$) of the switchable waveplate results in selecting a polarization orientation of display light that is either reflected or passed by the reflective polarizer. If the reflective polarizer passes the light, the optical assembly provides a first effective focal length (corresponding with a first FOV) and when the reflective polarizer reflects the light, the optical assembly provides a second effective focal length (corresponding with a second FOV).

When embodiments of the disclosed optical assembly are utilized to assist in focusing display light for a user of an HMD, a user can select between different FOVs for different contexts. In some embodiments, the FOV of the lens is switched at a high frame rate and images driven onto the display are interlaced to match the different FOVs of the optical assembly to present a combined image to the user. The combined image may be perceived by the user as being higher resolution in the middle while being a lower resolution in the remaining FOV. Consequently, using the same display, a higher resolution image can be presented to the user while also having the added benefit of a larger FOV overall. Having the middle of the combined image being higher resolution is of particular benefit because users of HMDs often spend a majority of their time gazing toward the middle of a presented image. Furthermore, having a combined image with higher resolution in the middle and lower resolution around the edges of a FOV may improve "presence" in a user's experience. These and other embodiments are described in detail below with respect to FIGS. 1-12.

FIG. 1 illustrates an example head mounted display (HMD) 100 that may include an optical assembly having switchable waveplates, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece (s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display for directing image light to a wearer of HMD 100. The display may include an LCD, an organic light emitting diode (OLED) display, micro-LED display, quantum dot display, pico-projector, or liquid crystal on silicon (LCOS) display for directing image light to a wearer of HMD 100. In some embodiments, an eye-tracking camera may be included in viewing structure 140 and positioned to capture image(s) of an eye of a user of HMD 100.

Figure 2:
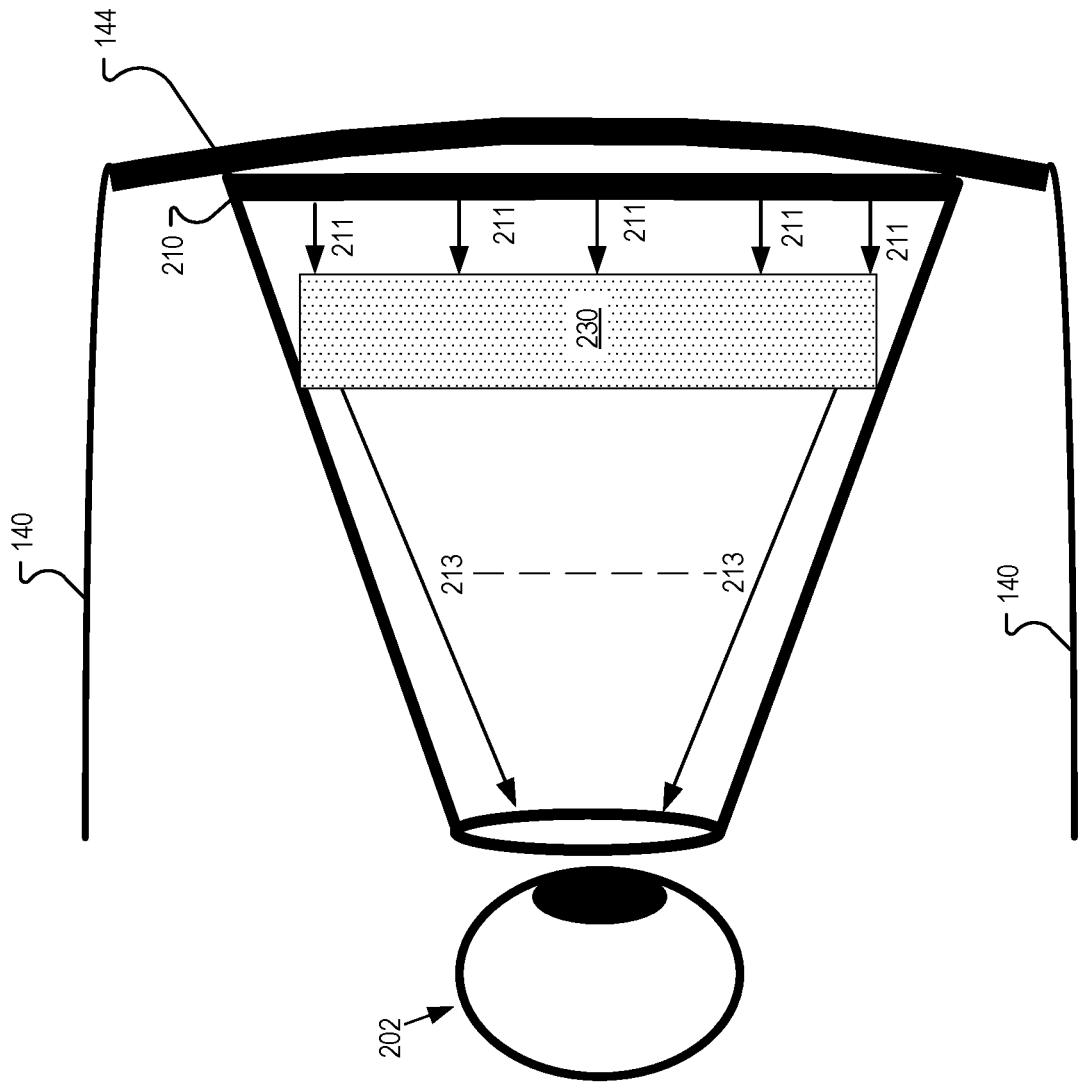
FIG. 2 illustrates a cut away view of an HMD that includes a display and an optical assembly configured to direct display light to an eyebox area, in accordance with an embodiment of the disclosure.

FIG. 2 illustrates a cut away view of an HMD that includes a display 210 and an optical assembly 230 configured to direct display light 211 to an eyebox area, in accordance with an embodiment of the disclosure. Optical assembly 230 is positioned to receive the display light 211 and direct the display light 211 to eye 202 as image light 213. Optical assembly 230 may be configured to allow eye 202 of a wearer of HMD 100 to focus on a virtual image displayed by display 210. Although FIG. 2 only illustrates one eye 202, an HMD may have a display 210 (or a portion of a shared display) and an optical assembly 230 for each eye of the user of the HMD.

Figure 3:
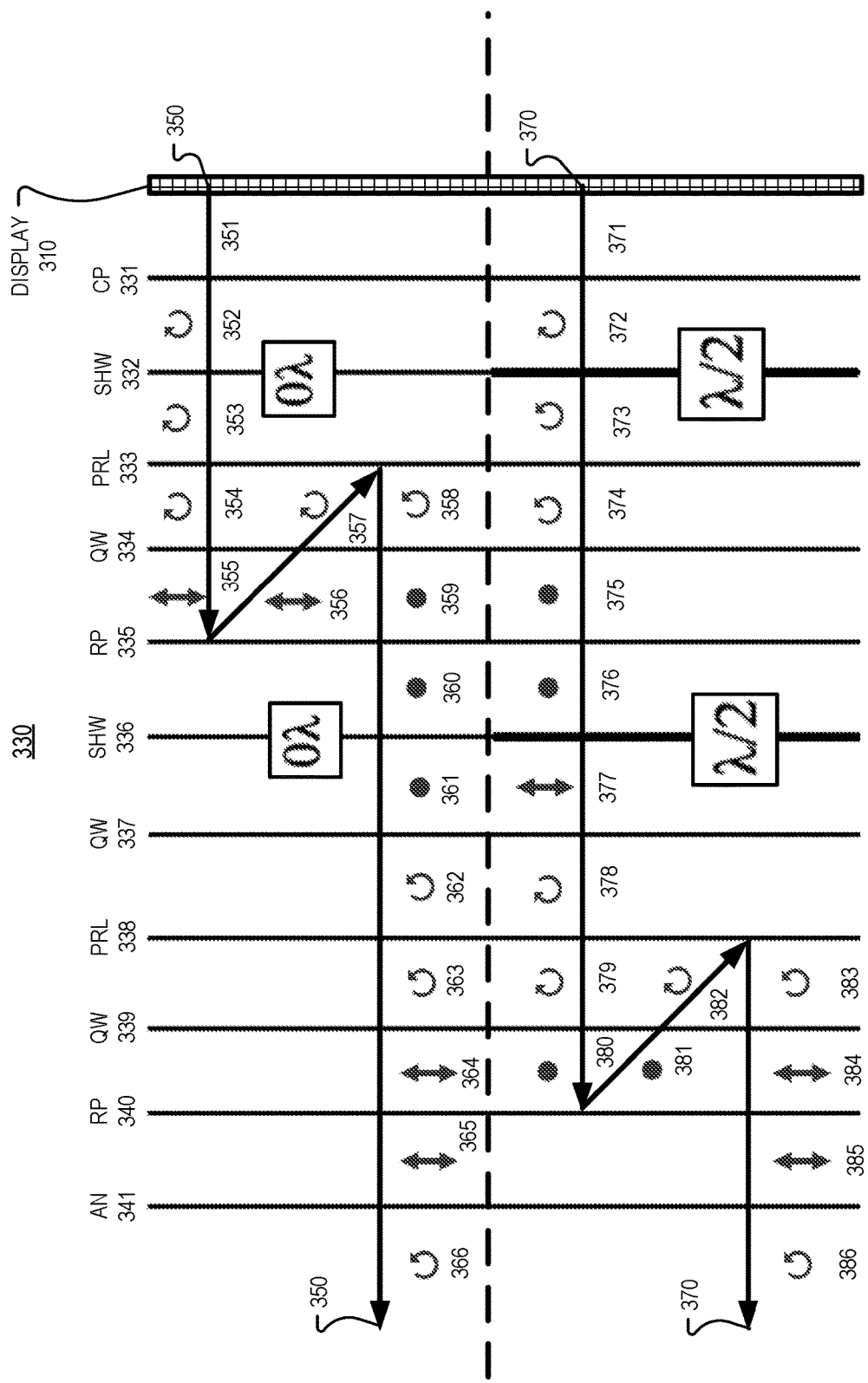
FIG. 3 illustrates different optical paths of an example optical assembly corresponding to retardance values driven onto switchable waveplates, in accordance with an embodiment of the disclosure.

FIG. 3 illustrates different optical paths of an example optical assembly 330 corresponding to retardance values driven onto switchable waveplates, in accordance with an embodiment of the disclosure. The optical elements included in example optical assembly 330 include a circular polarizer 331, a switchable half-waveplate 332, a partially reflective layer 333, a quarter-waveplate 334, a reflective polarizer 335, a switchable half-waveplate 336, a quarter-waveplate 337, a partially reflective layer 338, a quarter-waveplate 339, a reflective polarizer 340, and an optional anti-narcissus layer 341.

In operation, display 310 emits display light 351 for presenting images to a viewer. Optical path 350 represents the optical path of display light 351 through optical assembly 330 when both switchable half-waveplate 332 and switchable half-waveplate 336 are at a first retardance value. In the illustrated embodiment, the first retardance value is 0λ. Processing logic included in an HMD may be configured to drive switchable half-waveplates 332 and 336 to various retardance values (e.g. 0λ and λ/2). Switchable half-waveplates 332 and 336 may include a birefringent material (e.g. liquid crystals) that changes its orientation in response to an electrical signal (e.g. a voltage across transparent conductive layers where the liquid crystal is between the transparent conductive layers).

The display light 351 emitted by display 310 encounters circular polarizer 331 and circular polarizer 331 passes the circularly polarized display light as right-hand circularly polarized light 352, in the illustrated embodiment. As light 352 encounters switchable half-waveplate 332, it retains its right-hand orientation as light 353 since switchable half-waveplate 332 is driven to a 0λ retardance value. Light 353 then encounters partially reflective layer 333. A portion of light 353 is reflected and lost (not illustrated) and the remaining portion continues as light 354, still retaining its right-hand circularly polarized orientation. Partially reflective layer 333 may be a partially mirrored surface configured to transmit 50% of incident light and reflect 50% of incident light, for example. Quarter-waveplate 334 is configured to convert incident right-hand circularly polarized light 354 into linearly polarized light 355. In the illustrated embodiment, quarter-waveplate 334 is oriented with its fast axis at 135° such that the output linearly polarized light 355 is vertically oriented.

Reflective polarizer surface 335 is configured to reflect light of one polarization orientation and pass (transmit) light of a second polarization orientation. In the illustrated embodiment, reflective polarizer 335 is configured to reflect vertical linearly polarized light and pass horizontal linearly polarized light. Consequently, reflective polarizer 335 reflects vertical linearly polarized light 355 as vertical linearly polarized light 356. Quarter-waveplate 334 converts vertical linearly polarized light 356 to right-hand polarized light 357. A portion of light 357 passes through partially reflective layer 333 (not illustrated) and the remaining portion is reflected by partially reflective layer 333 as left-hand circularly polarized light 358. The reflection of right-hand circularly polarized light 357 from partially reflective layer 333 changes the orientation of the light to left-hand circularly polarized light 358. Quarter-waveplate 334 receives light 358 and converts it to linearly polarized light 359, illustrated as horizontally-polarized in the illustrated example of FIG. 3. Since reflective polarizer 335 is configured to pass horizontal linearly polarized light in the illustrated embodiment, horizontal linearly polarized light 359 passes through reflective polarizer 335 as horizontal linearly polarized light 360.

Horizontal linearly polarized light 360 encounters switchable half-waveplate 336, but retains its horizontal linearly polarized orientation as light 361 since switchable half-waveplate 336 is driven to have a retardance value 0λ. Quarter-waveplate 337 receives light 361 and converts it to circularly polarized light 362, illustrated as having a left-hand orientation in the illustrated example of FIG. 3. A portion of light 362 is reflected (not illustrated) by partially reflective layer 338 while the remaining portion passes through partially reflective layer 338 as light 363. Partially reflective layer 338 may be configured similarly to partially reflective layer 333. Left-hand circularly polarized light 363 is converted to vertical linearly polarized light 364 by quarter-waveplate 339 and passes through reflective polarizer 340 since reflective polarizer 340 is configured to pass vertical linearly polarized light and reflect horizontal linearly polarized light. Vertical linearly polarized light 365 may optionally be converted to circularly polarized light 366 by anti-narcissus layer 341. By including the optional anti-narcissus layer 341, an HMD user is less likely to see reflections of her own eye from light 366 reflecting off the eye of the user and again reflecting off one or more of the layers illustrated in FIG. 3.

Turning now to optical path 370, display 310 emits display light 371 and right-hand circularly polarized light 372 is generated by circular polarizer 331. Light 372 then encounters switchable half-waveplate 332. Optical path 370 illustrates the optical path of display light when both switchable half-waveplates 332 and 336 are driven to an example retardance value of λ/2. Consequently, switchable half-waveplate 332 (driven to λ/2 by processing logic of the HMD) converts right-hand circularly polarized light 372 to left-hand circularly polarized light 373. A portion of light 373 is reflected and lost (not illustrated) and the remaining portion continues propagating as light 374, still retaining its left-hand circularly polarized orientation. Light 374 is converted to horizontal linearly polarized light 375 by quarter-waveplate 334 and passes through reflective polarizer 335 as horizontal linearly polarized light 376. Since switchable half-waveplate 336 is driven to provide a retardance value of λ/2, horizontal linearly polarized light 376 is converted to vertical linearly polarized light 377, in FIG. 3. Quarter-waveplate 337 converts vertical linearly polarized light 377 to right-hand circularly polarized light 378. A portion of light 378 is reflected by partially reflective layer 338 (not illustrated) and the remaining portion is passed by partially reflective layer 338 as right-hand circularly polarized light 379.

Quarter-waveplate 339 converts right-hand circularly polarized light 379 into horizontal linearly polarized light 380. Horizontal linearly polarized light 380 is reflected by reflective polarizer 340 as light 381 since reflective polarizer 340 is configured to reflect horizontal linearly polarized light and pass vertical linearly polarized light. Horizontal linearly polarized light 381 is converted to right-hand circularly polarized light 382 by quarter-waveplate 339 and light 382 is reflected by partially reflective layer 338 as left-hand circularly polarized light 383. Quarter-waveplate 339 converts left-hand circularly polarized light 383 into vertical linearly polarized light 384. Vertical linearly polarized light 384 passes through reflective polarizer 340 as vertical linearly polarized light 385 and is optionally converted to left-hand circularly polarized light 386 by anti-narcissus layer 341.

Figure 4A:
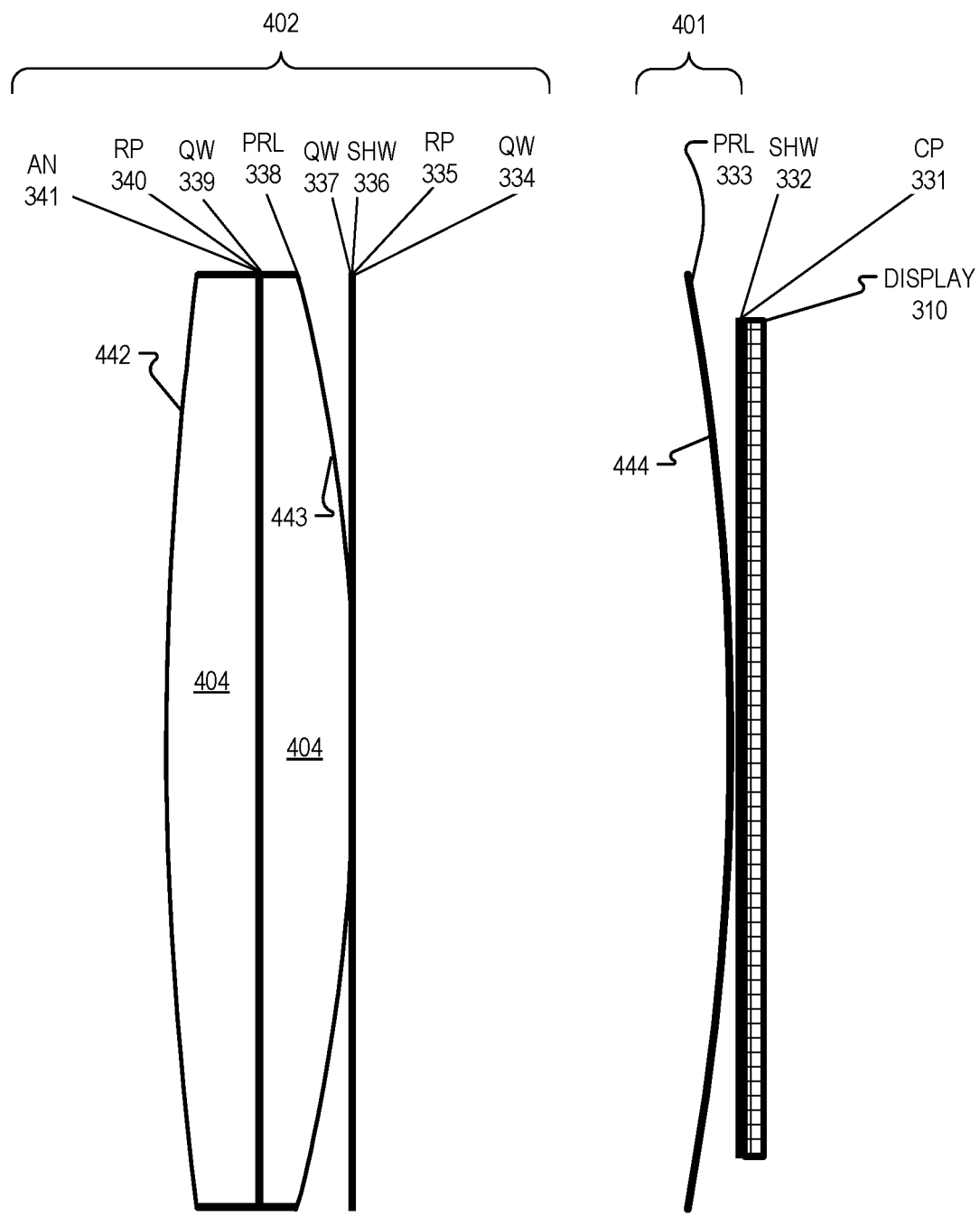
FIGS. 4A-4C illustrate an arrangement of an example lens assembly that includes curved surfaces to provide different effective focal lengths to different optical paths, in accordance with an embodiment of the disclosure.
Figure 4B:
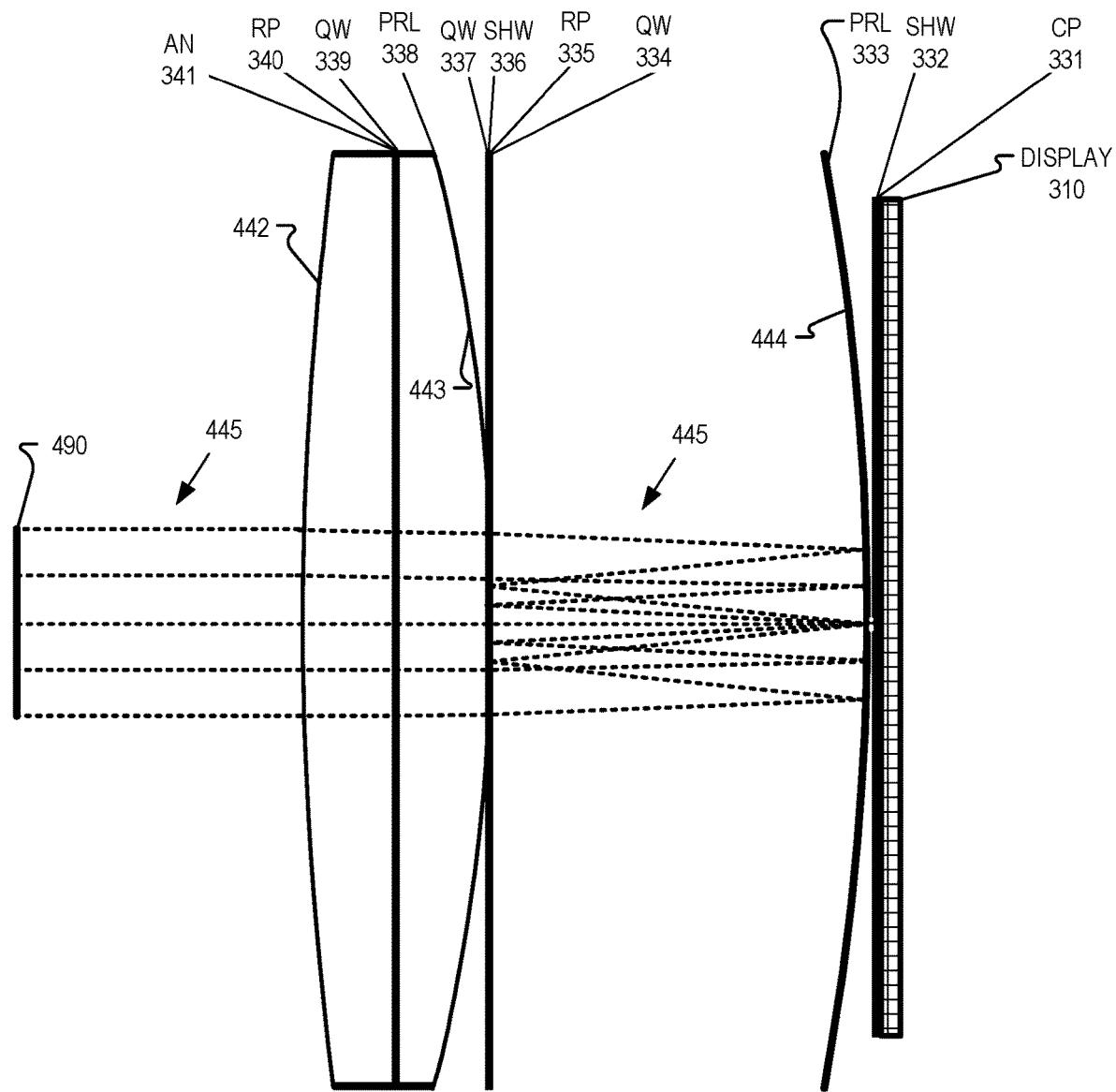
Figure 4C:
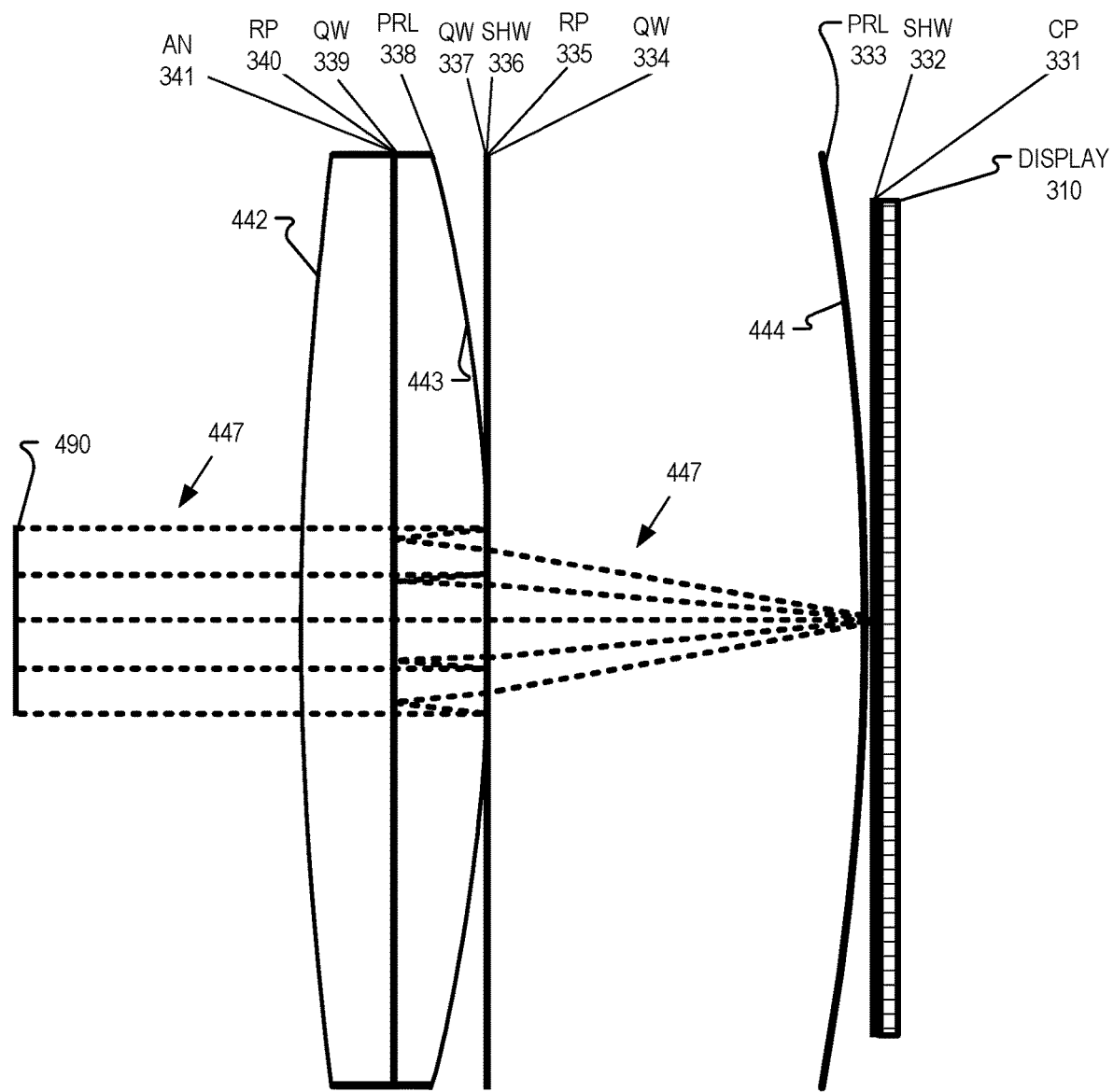

As shown in FIG. 3, selectively driving retardance values on switchable half-waveplates 332 and 336 allows for selecting different optical paths 350 and 370 for display light emitted from display 310. FIG. 4A illustrates an arrangement of an example lens assembly 433 that includes curved surfaces to provide different effective focal lengths to the different optical paths 350 and 370, in accordance with an embodiment of the disclosure. In FIG. 4A, partially reflective layer 333 is disposed on curved surface 444 and partially reflective layer 338 is disposed on curved surface 443. As shown in FIG. 3, when switchable half-waveplates 332 and 336 are driven with a retardance value of 0λ, light path 350 includes a reflection off of partially reflective layer 333. Thus, a partially reflective layer 333 disposed on curved surface 444 provides optical power when switchable half-waveplates 332 and 336 are driven with the retardance value of 0λ, as shown by rays 445 in FIG. 4B. And, when switchable half-waveplates 332 and 336 are driven with the a retardance value of λ/2, light path 370 includes a reflection off of partially reflective layer 338 that propagates toward an eye of a user of an HMD. Thus, partially reflective layer 338 disposed on curved surface 443 provides optical power when switchable half-waveplates 332 and 336 are driven with the retardance value of λ/2, as shown by rays 447 in FIG. 4C. Rays 445 and 447 are shown as focusing display light in an eyebox area 490 for a user of an HMD.

FIG. 4A shows that example optical element 402 may include one or more refractive materials 404 to support curvature 443. Similarly, curved surface 444 may be supported by refractive materials (e.g. a plano-concave lens, not illustrated). Optical element 402 may also provide an additional curved surface 442 that imparts optical power to display light propagating along light path 350 and light path 370. Hence, the effective focal length of lens assembly 433 may be a combination of the optical power provided by curved surface 444 and 442 (when light path 350 is utilized) or a combination of the optical power provided by curved surface 442 and 443 (when light path 370 is utilized). In some embodiments, optical element 402 does not include a curved surface 442. In some embodiment, optical element 402 includes a Fresnel lens that imparts optical power. In an embodiment, the effective focal length of lens assembly 433 illustrated in FIG. 4B (when switchable half-waveplates 332 and 336 driven with the retardance value of 0λ) is approximately 50 mm. The effective focal length of lens assembly 433 illustrated in FIG. 4C (when switchable half-waveplates 332 and 336 driven with the retardance value of λ/2) may be approximately 27 mm. Other effective focal lengths are also possible.

Figure 5:
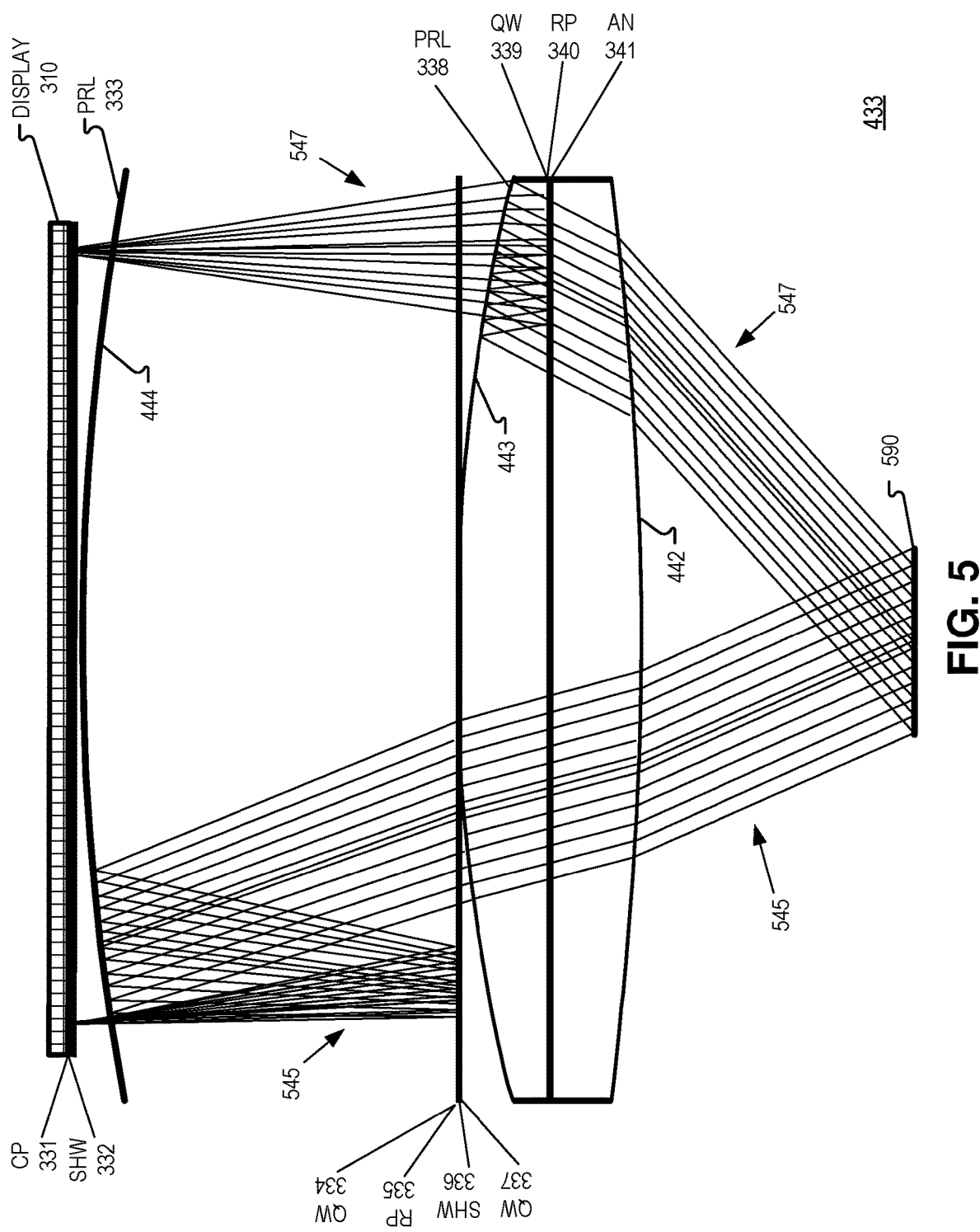
FIG. 5 illustrates additional off-axis ray paths of an example lens assembly, in accordance with embodiments of the disclosure.

FIG. 5 illustrates additional ray paths 545 and 547 which are the off-axis versions of ray paths 445 and 447, respectively, that reach eyebox area 590, in accordance with embodiments of the disclosure. Rays 545 correspond to the effective focal length illustrated by rays 445 and rays 547 correspond to the effective focal length illustrated by rays 447.

Figure 6B:
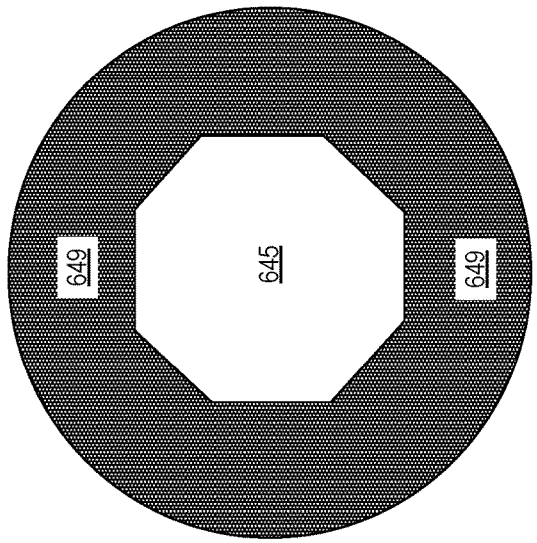
FIGS. 6A-C illustrate example fields of views that correspond with effective focal lengths of an optical assembly, in accordance with embodiments of the disclosure.
Figure 6C:
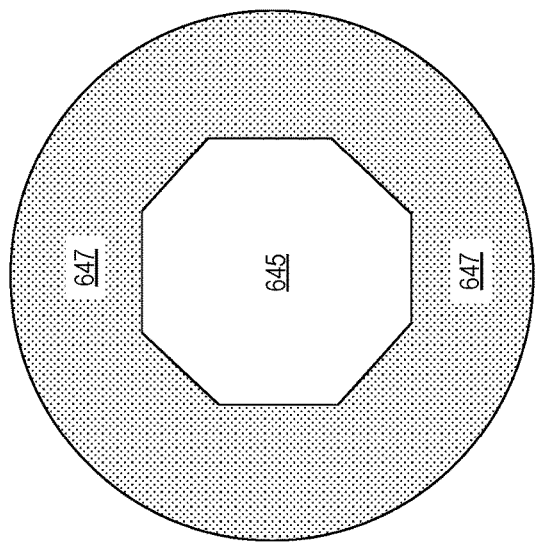
Figure 6A:
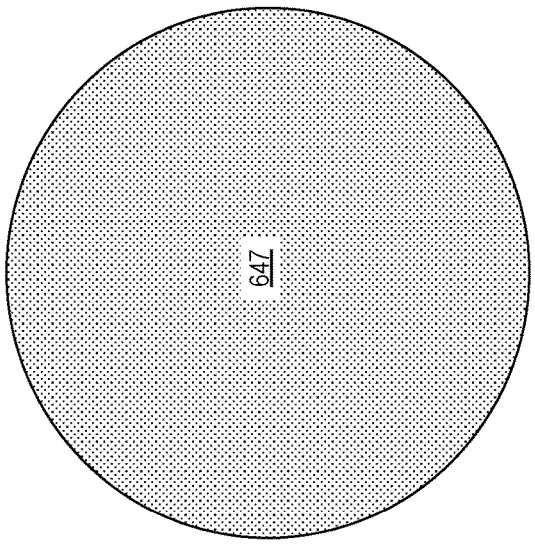

FIGS. 6A-C illustrates example fields of view that correspond with effective focal lengths of a lens assembly, in accordance with embodiments of the disclosure. In FIG. 6A, field of view (FOV) 647 corresponds with the effective focal length of rays 447/547. FOV 647 may be approximately 100° and correspond with the shorter effective focal length of lens assembly 433. In FIG. 6B, field of view (FOV) 645 corresponds with the effective focal length of rays 445/545. FOV 645 may be approximately 50° and correspond with the longer effective focal length of lens assembly 433. The illustrated FOV 645 corresponds to a configuration where the display providing the display light is shaped as an octagon, although other display shapes (including rectangular) may also be used in accordance with embodiments of this disclosure. In this illustration, the edges of FOV 645 is display-limited. In other embodiments, vignetting outside the clear aperture of other optical surfaces make FOV 545 "lens-limited." FIG. 6B also includes a void area 649 where no image is presented to a user by lens assembly 433.

FIG. 6C illustrates an embodiment where images may be presented to a user of an HMD that includes display 310 and lens assembly 433 in a time sequential manner so that a first image is presented in FOV 645 during a first time period and a second image is presented in FOV 647 during a second time period. When images are interlaced at the different FOVs 645 and 647 at a high frame rate (e.g. 140 frames per second) the switching between images may be unnoticeable to a user and a user may perceive the first image in FOV 645 and the second image presented in FOV 647 as one combined image presented at a same virtual image plane. The first image presented in FOV 645 may appear to the user as being higher resolution than a second image presented in FOV 647. Providing a time sequential combined image to a user using lens assembly 433 will be described in additional detail in connection with the description of FIGS. 9A-11.

Figure 7:
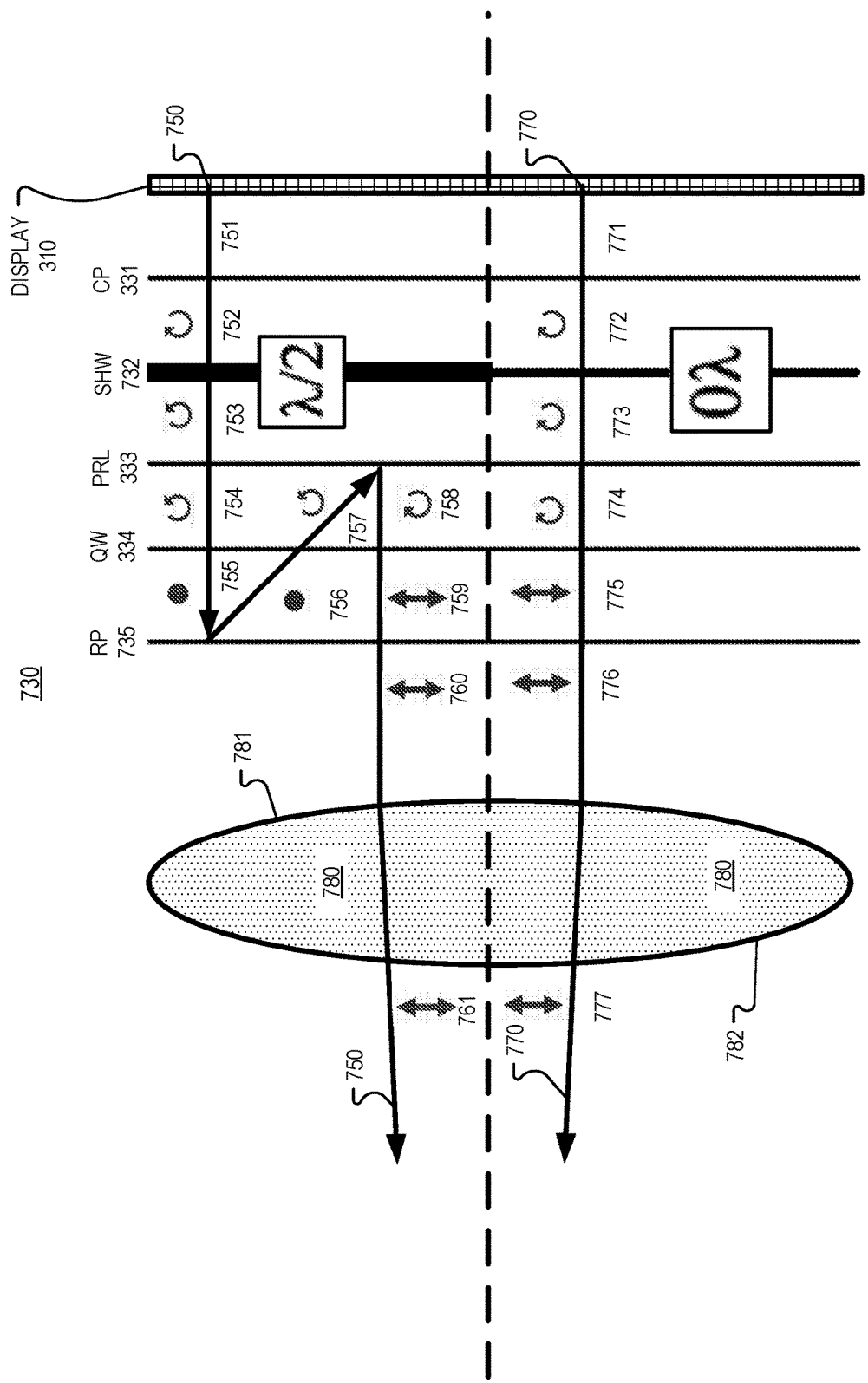
FIG. 7 illustrates different optical paths of an example optical assembly corresponding to a retardance value driven onto a switchable waveplate, in accordance with an embodiment of the disclosure.

FIG. 7 illustrates different optical paths of an example optical assembly 730 corresponding to a retardance value driven onto a switchable waveplate, in accordance with an embodiment of the disclosure. Optical assembly 730 includes a portion of the optical elements included in FIG. 3. For example, optical assembly 730 include a circular polarizer 331, a partially reflective layer 333, and a quarter-waveplate 334. Optical assembly 730 also includes a switchable half-waveplate 732 and reflective polarizer 735. Switchable half-waveplate 732 may be configured similarly to switchable half-waveplate 332. The example optical assembly 730 includes one switchable waveplate instead of the two switchable waveplates included in optical assembly 330.

In operation of optical assembly 730, display 310 emits display light 751 for presenting images to a viewer. Optical path 750 represents the optical path of display light 751 through optical assembly 730 when switchable half-waveplate 732 is driven to a first retardance value. In the illustrated embodiment of FIG. 7, the first retardance value is λ/2. Processing logic included in an HMD may be configured to drive switchable half-waveplate 732 to various retardance values (e.g. 0λ and λ/2).

The display light 751 emitted by display 310 encounters circular polarizer 331 and circular polarizer 331 passes the circularly polarized display light as right-hand circularly polarized light 752, in the illustrated embodiment. Light 752 encounters switchable half-waveplate 732 (driven to λ/2 by processing logic of the HMD, for example) which converts right-hand circularly polarized light 752 to left-hand circularly polarized light 753. Light 753 then encounters partially reflective layer 333. A portion of light 753 is reflected and lost (not illustrated) and the remaining portion continues as light 754, still retaining its left-hand circularly polarized orientation. In the illustrated embodiment quarter-waveplate 334 is configured to convert incident circularly polarized light 754 to linear polarized light 755. In the illustrated embodiment, quarter waveplate 334 converts left-hand circularly polarized light 754 to horizontal linearly polarized light 755.

Reflective polarizer surface 735 is configured to reflect light of one polarization and pass (transmit) light of a second polarization. In the illustrated embodiment, reflective polarizer 735 is configured to reflect horizontal linearly polarized light and pass vertical linearly polarized light. Consequently, reflective polarizer 735 reflects light 755 as horizontal linearly polarized light 756. Quarter-waveplate 334 converts horizontal linearly polarized light 756 to left-hand circularly polarized light 757. A portion of light 757 passes through partially reflective layer 333 (not illustrated) and the remaining portion is reflected by partially reflective layer 333 as right-hand circularly polarized light 758. The reflection of left-hand circularly polarized light 757 from partially reflective layer 333 changes the orientation of the light to right-hand circularly polarized light 758. Quarter-waveplate 334 receives light 758 and converts it to linearly polarized light 759, illustrated as having vertical orientation in FIG. 7. Since reflective polarizer 735 is configured to pass vertical linearly polarized light in the illustrated embodiment, vertical linearly polarized light 759 passes through reflective polarizer 735 as vertical linearly polarized light 760.

Vertical linearly polarized light 760 encounters optical element 780 and exits optical element 780 as vertical linearly polarized light 761, in the illustrated embodiment. In FIG. 7, optical element 780 is illustrated as a refractive optical element having curved surfaces 781 and 782 to impart optical power to light 760. In other embodiments, optical element 780 may have only one curved surface or include a Fresnel lens to provide optical power. In other embodiments, optical element 780 may include a group of multiple lenses of various optical materials, either air-spaced or bonded together (e.g. an achromatic doublet).

Turning now to optical path 770, display 310 emits display light 771 and right-hand circularly polarized light 772 is generated after display light 771 encounters circular polarizer 331. Light 772 then encounters switchable half-waveplate 732. Optical path 770 illustrates the optical path of display light when switchable half-waveplate 732 is driven to an example retardance value of 0λ. Consequently, light 772 retains its right-hand circularly polarized orientation when switchable half-waveplate 732 is driven to 0λ and exits switchable half-waveplate 732 as right-hand circularly polarized light 773. A portion of light 773 is reflected and lost (not illustrated) and the remaining portion continues as light 774, still retaining its right-hand circularly polarized orientation. Light 774 is converted to vertical linearly polarized light 775 by quarter-waveplate 334 and passes through reflective polarizer 735 as vertical linearly polarized light 776.

Vertical linearly polarized light 776 encounters optical element 780 and exits optical element 780 as vertical linearly polarized light 777, in the illustrated embodiment. As shown in FIG. 7, selectively driving retardance values on switchable half-waveplate 732 allows for selecting different optical paths 750 and 770 for display light emitted from display 710.

Figure 8A:
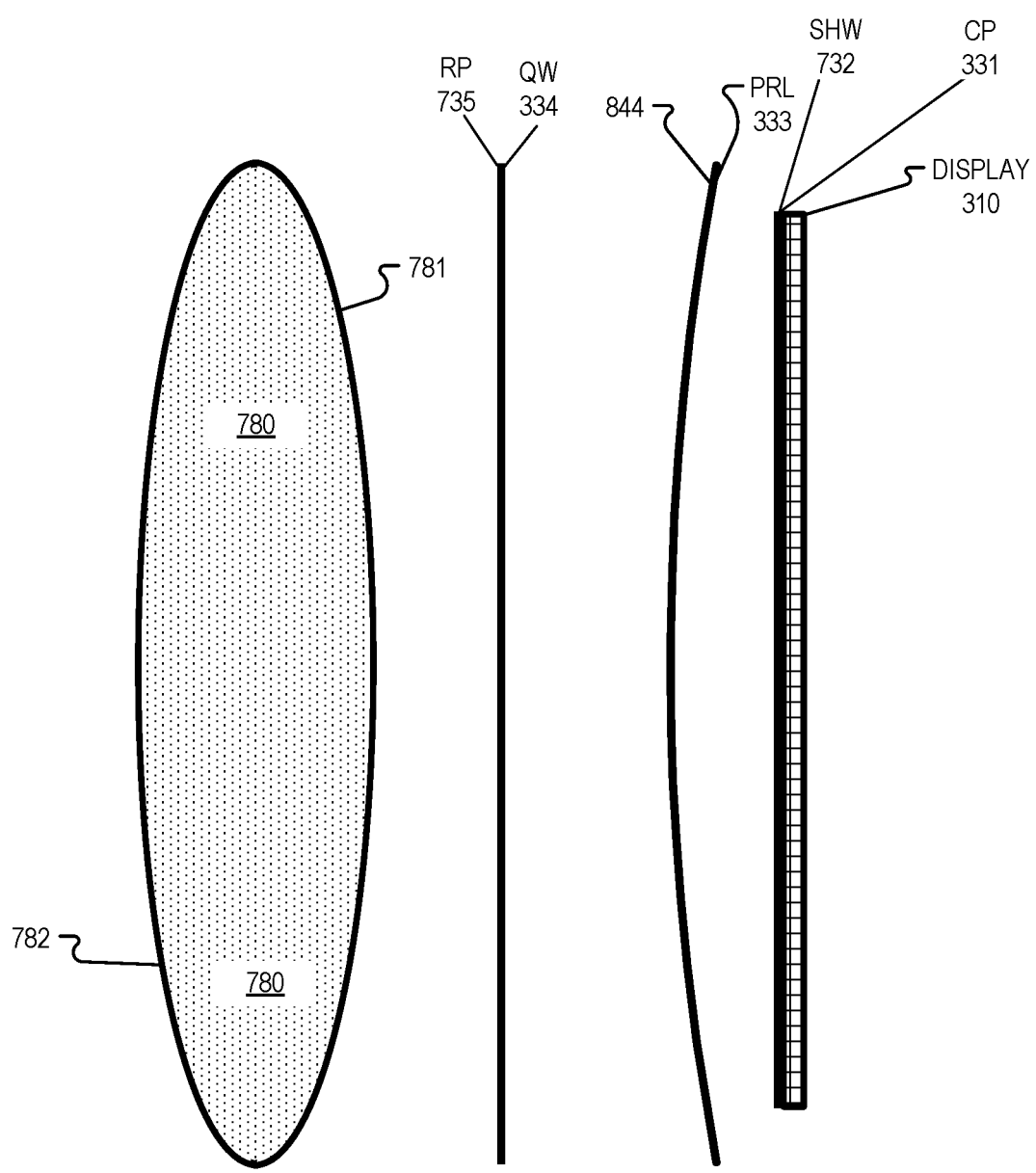
FIGS. 8A-8C illustrate an example lens assembly including an example refractive lens, in accordance with embodiments of the disclosure.
Figure 8B:
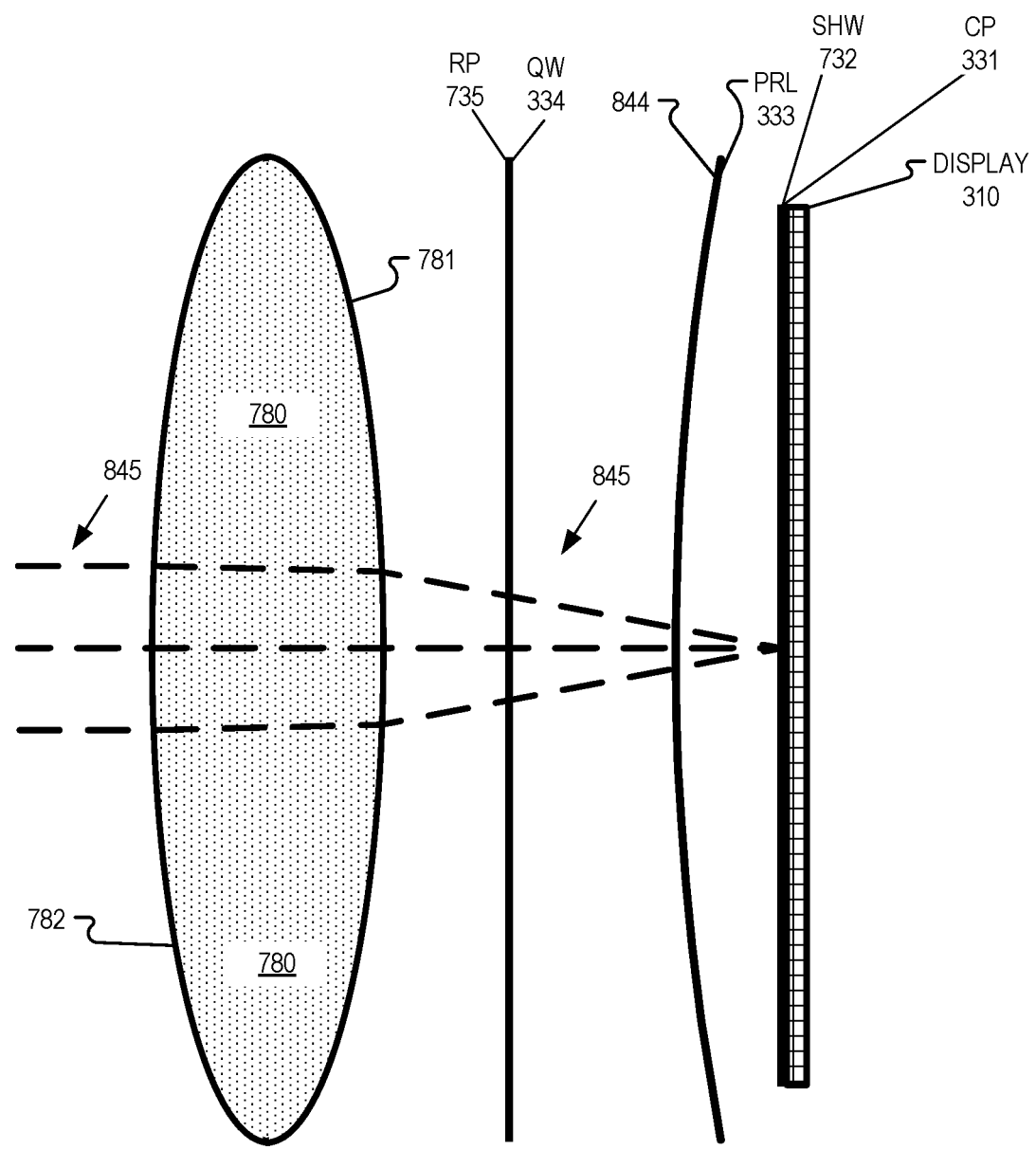
Figure 8C:
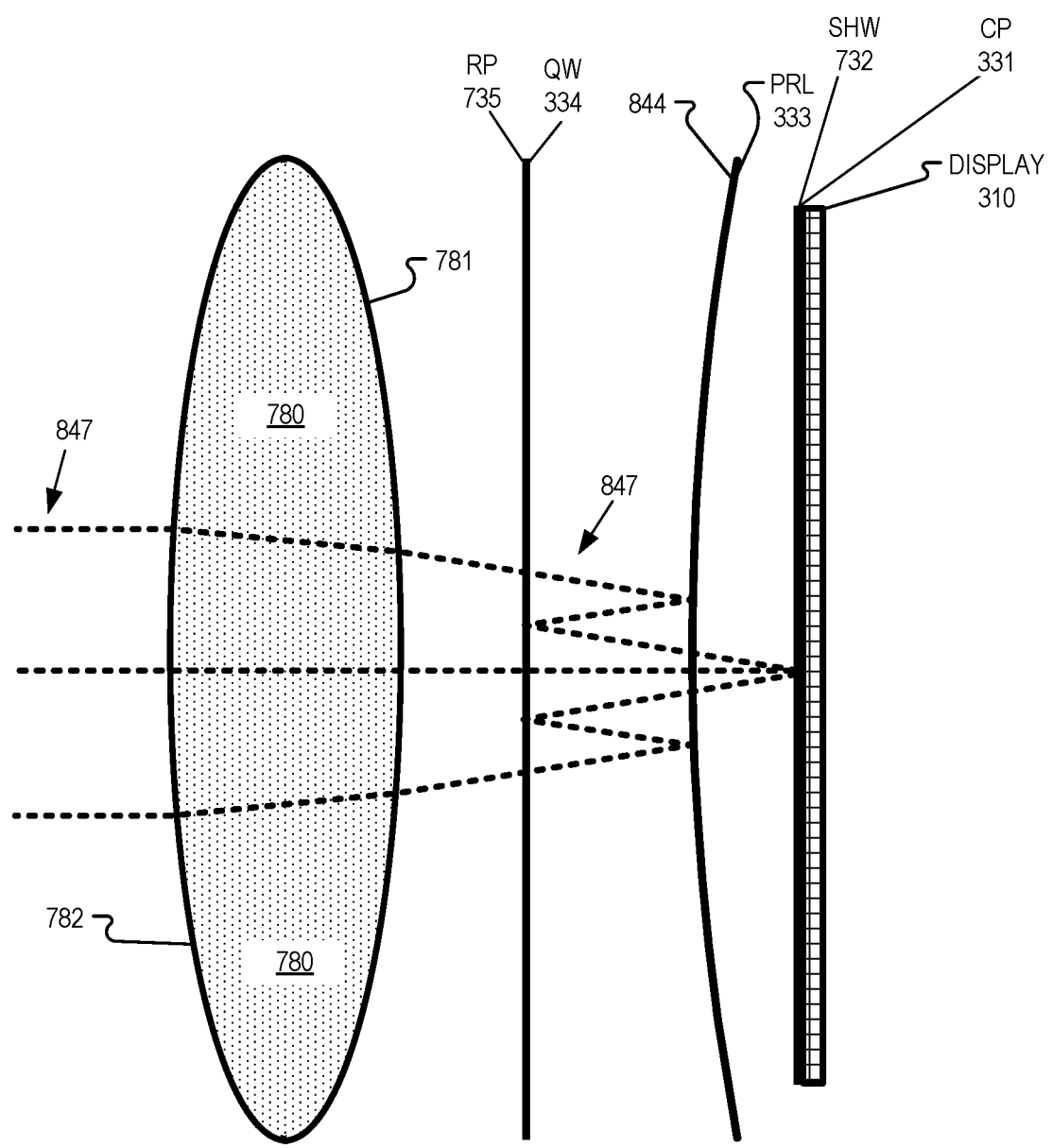

In FIG. 8A illustrates an example lens assembly 833 including an example refractive lens, in accordance with embodiments of the disclosure. In FIG. 8A, partially reflective layer 333 is disposed on curved surface 844. When switchable half-waveplate 732 is driven with a retardance value of 0λ, curved surface 844 does not provide optical power in reflection as shown by rays 845 in FIG. 8B. But when switchable half-waveplate 732 is driven with the retardance value of λ/2, partially reflective layer 333 disposed on curved surface 844 does provides optical power in reflection, as shown by rays 847 in FIG. 8C. Hence, when switchable half-waveplate 732 is driven to λ/2, the optical power of optical assembly 730 is generated by the combination of the optical power provided by curved surface 844 and optical element 780. And, when switchable half-waveplate 732 is driven to 0λ, the optical power of optical assembly 730 is generated by the optical power provided by optical element 780.

Figure 9A:
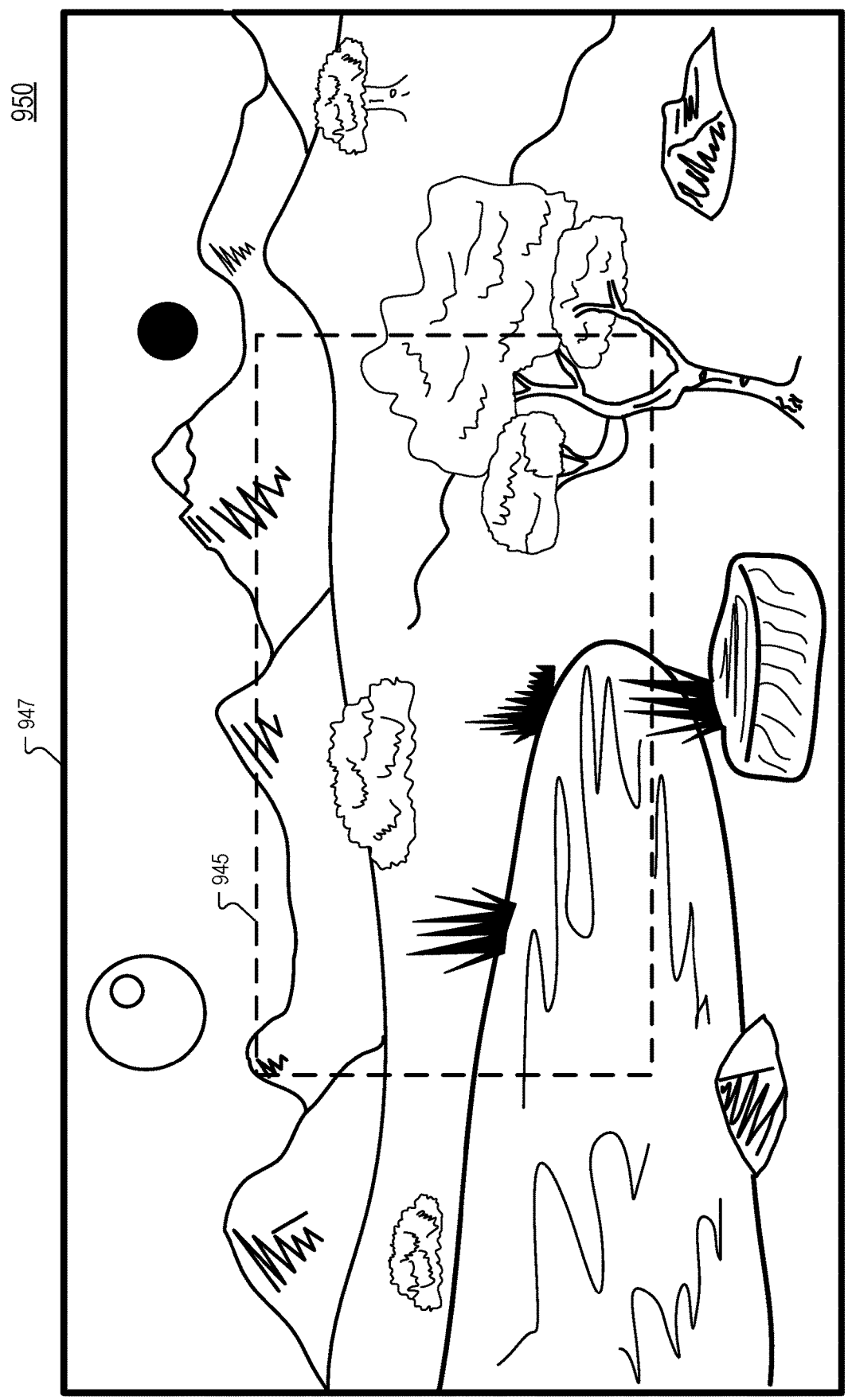
FIGS. 9A-C illustrate a first image and second image that may be perceived as a combined image to users of a HMD, in accordance with embodiments of the disclosure.
Figure 9B:
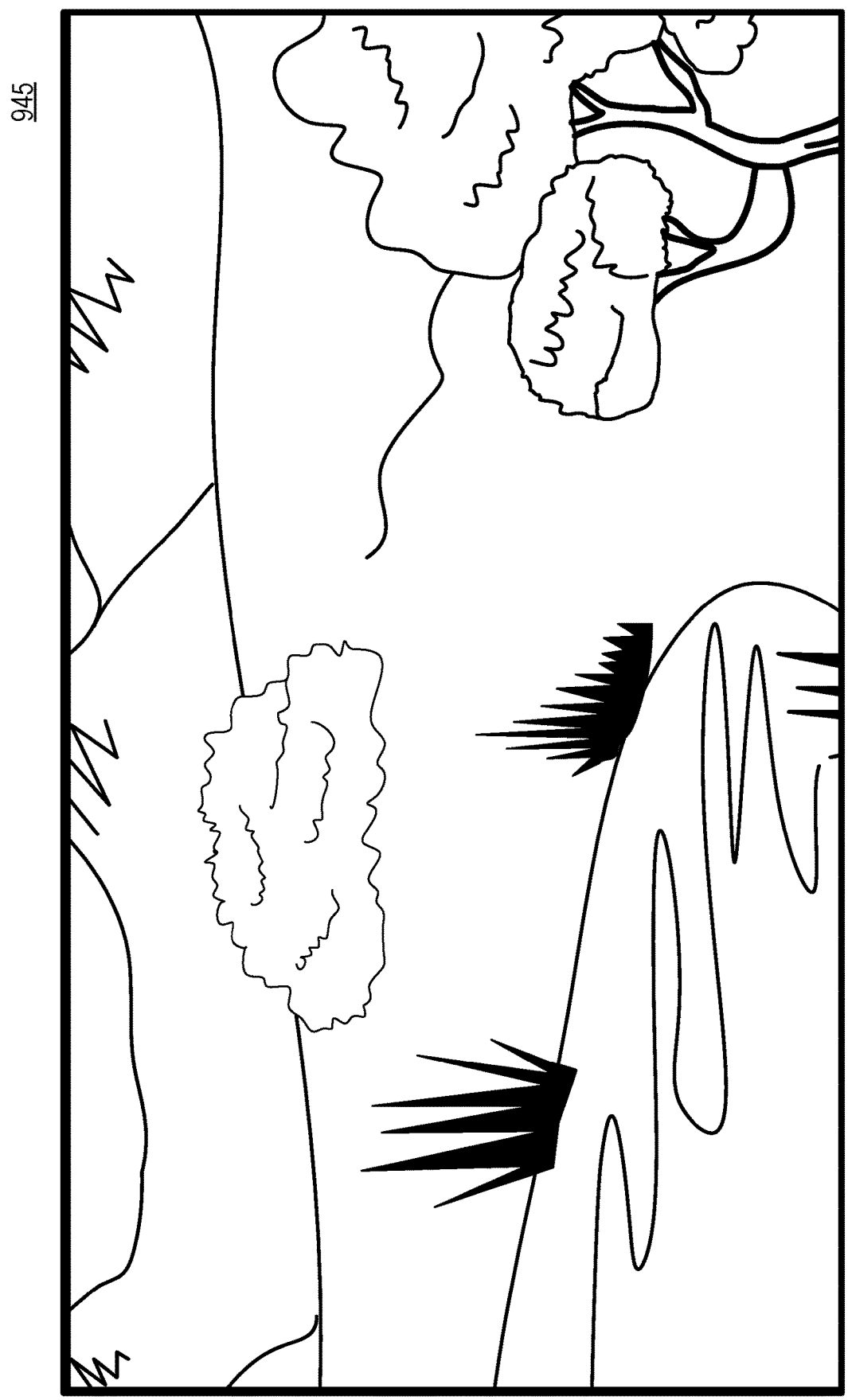
Figure 9C:
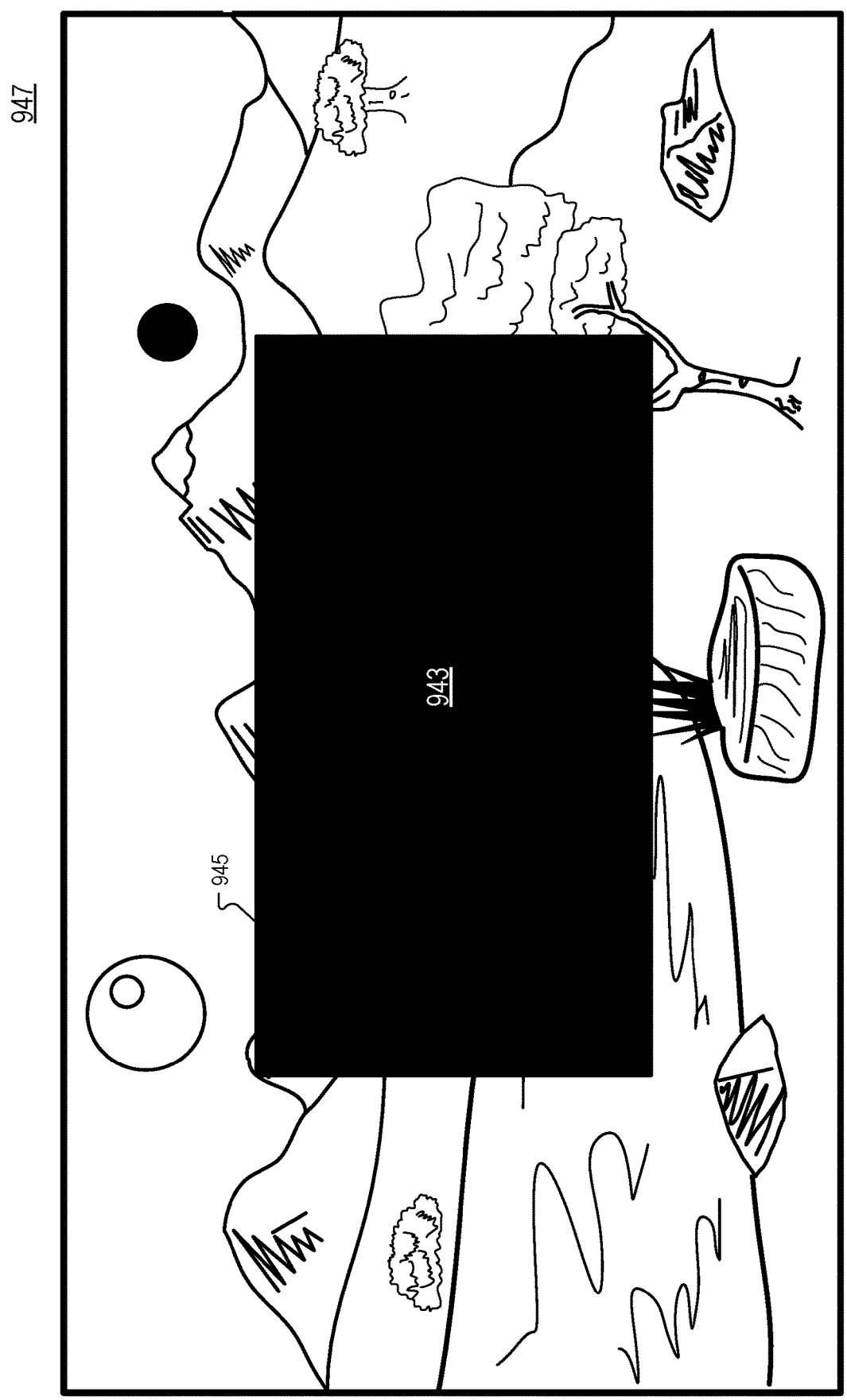

FIGS. 9A-C illustrate a first image and second image that may be perceived as a combined image to users of a HMD, in accordance with embodiments of the disclosure. FIG. 9A illustrates an example rectangular combined image 950 for presenting to a user of a HMD. Those skilled in the art understand that although rectangular images are illustrated in FIGS. 9A-9C, non-rectangular images corresponding to non-rectangular displays or FOV limited by rounded lens apertures may also be utilized. Combined image 950 includes a first image 945 and a second image 947. Image 945 and image 947 may be presented sequentially to the users at a high frame rate so that the user perceives the sequential presentation of image 945 with image 947 as combined image 950. Image 945 may correspond with a FOV 645 and image 945 may be perceived as a higher resolution than image 947 even when image 945 and 947 are driven onto the same display and have the same spatial resolution on the display. Image 947 may correspond to FOV 647.

FIG. 9B illustrates first image 945 that may be driven onto a display while lens assembly 433 or 733 is switched to have a longer effective focal length (narrower FOV). FIG. 9C illustrates a second image 947 that may be driven onto the same display while lens assembly 433 or 733 is switched to have a shorter effective focal length (wider FOV) subsequent to image 945. Notably, image 947 may have a void 943 that occupies the FOV 645 where the first image is presented. A portion of the pixels in the display may be driven to be black pixels to generate void 943. This may prevent the display light that would be emitted in void 943 from intermixing with the display light from image 945 that will be presented in FOV 645 as higher resolution. Those skilled in the art will recognize that there are a variety of techniques to gracefully blend the boundary at the edge of FOV 945. For example, the brightness of the boundary may fall off according to a pre-calculated vignetting function.

Figure 10A:
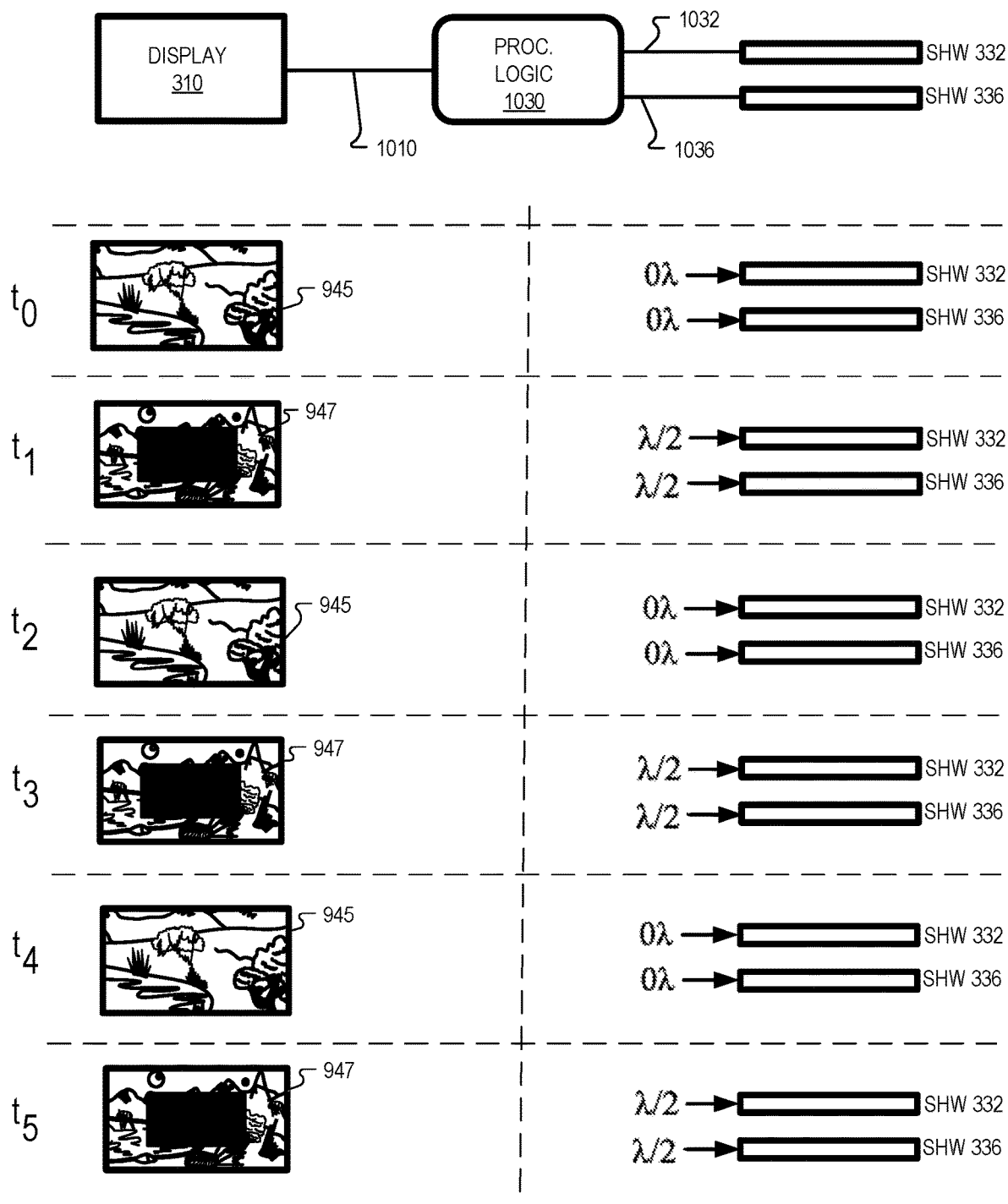
FIGS. 10A-B illustrate hybrid circuit-timing diagrams, in accordance with embodiments of the disclosure.

FIG. 10A illustrates a hybrid circuit-timing diagram, in accordance with an embodiment of the disclosure. FIG. 10A includes display 310, processing logic 1030, switchable half-waveplate 332, and switchable half-waveplate 336. FIG. 10A corresponds to operating display 310 and optical assembly 330 of FIG. 3. Processing logic 1030 is coupled to drive images onto display 310 via display data interface 1010. Processing logic 1030 is coupled to drive a retardance value onto switchable half-waveplate 332 via interface 1032. Processing logic 1030 is also coupled to drive a retardance value onto switchable half-waveplate 336 via interface 1036.

At time $t_0$, $t_2$, and $t_4$, processing logic 1030 drives image 945 onto display 310 and drives a retardance value $0\lambda$ onto switchable half-waveplates 332 and 336. At time $t_1$, $t_3$, and $t_5$, processing logic 1030 drives image 947 onto display 310 and drives a retardance value $\lambda/2$ onto switchable half-waveplates 332 and 336. As shown in FIG. 10A, image 945 may be time sequentially interlaced with image 947 so that image 947 and image 945 are perceived as a same combined image 950 by a user of an HMD.

Figure 10B:
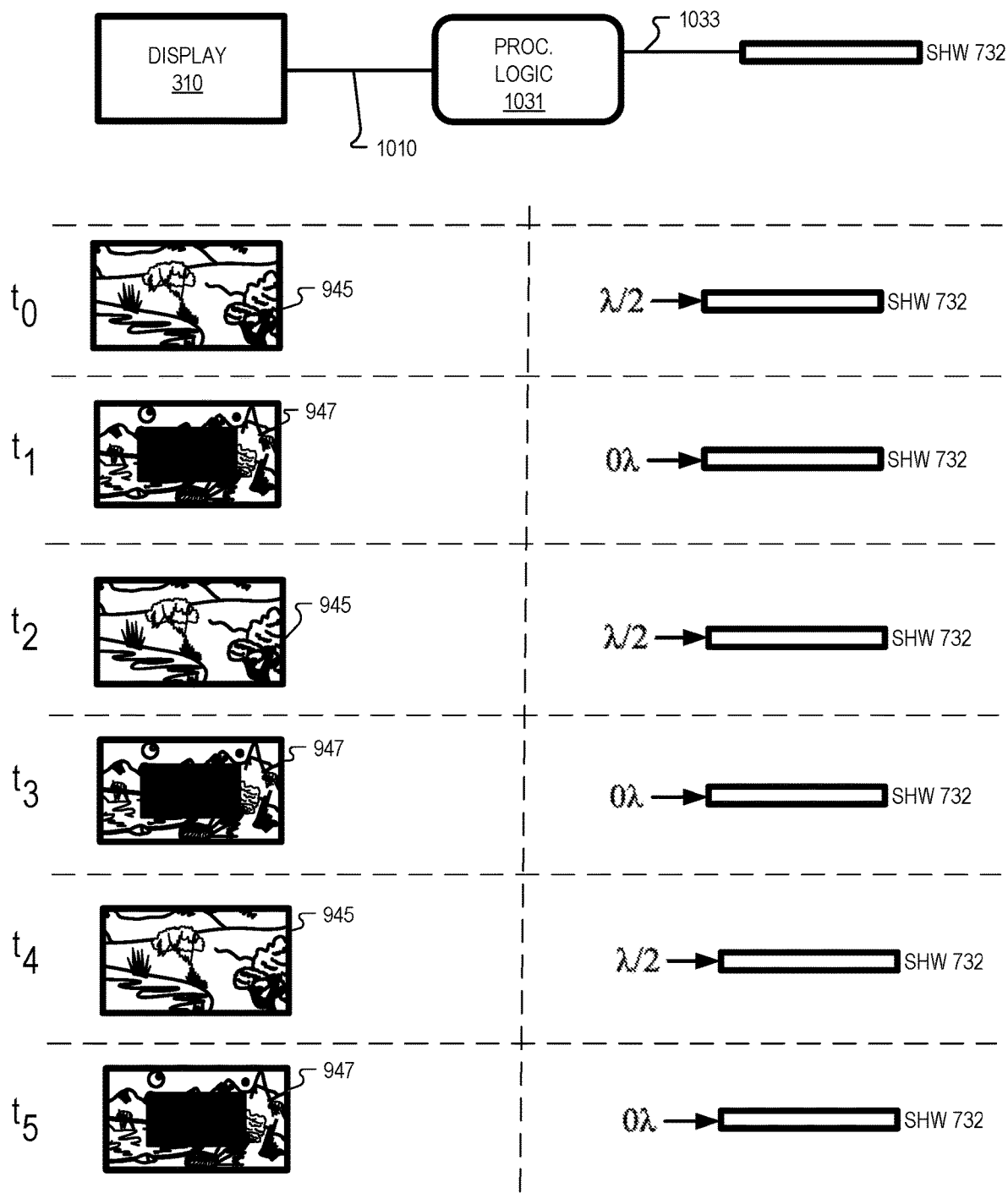

FIG. 10B illustrates a hybrid circuit-timing diagram, in accordance with an embodiment of the disclosure. FIG. 10B includes display 310, processing logic 1031, and switchable half-waveplate 732. FIG. 10B corresponds to operating display 310 and optical assembly 730 of FIG. 7. Processing logic 1031 is coupled to drive images onto display 310 via display data interface 1010. Processing logic 1031 is also coupled to drive a retardance value onto switchable half-waveplate 732 via interface 1033.

At time $t_0$, $t_2$, and $t_4$, processing logic 1031 drives image 945 onto display 310 and drives a retardance value $\lambda/2$ onto switchable half-waveplate 732. At time $t_1$, $t_3$, and $t_5$, processing logic 1031 drives image 947 onto display 310 and drives a retardance value $0\lambda$ onto switchable half-waveplate 732. As shown in FIG. 10B, image 945 may be time sequentially interlaced with image 947 so that image 947 and image 945 are perceived as a same combined image 950 by a user of an HMD.

In both FIGS. 10A and 10B, image 947 and image 945 may be presented on a same virtual image plane. In some embodiments, each time period (e.g. $t_0$, $t_1$, ..., $t_5$) is less than 10 ms and corresponds to a frame rate of greater than 100 frames per second. Other frame rates may also be utilized. Static images or motion pictures (video) may be presented to a user of an HMD using the described method of time sequentially interlacing images (while changing the effective focal length of optical assemblies 330 or 730).

Figure 11:
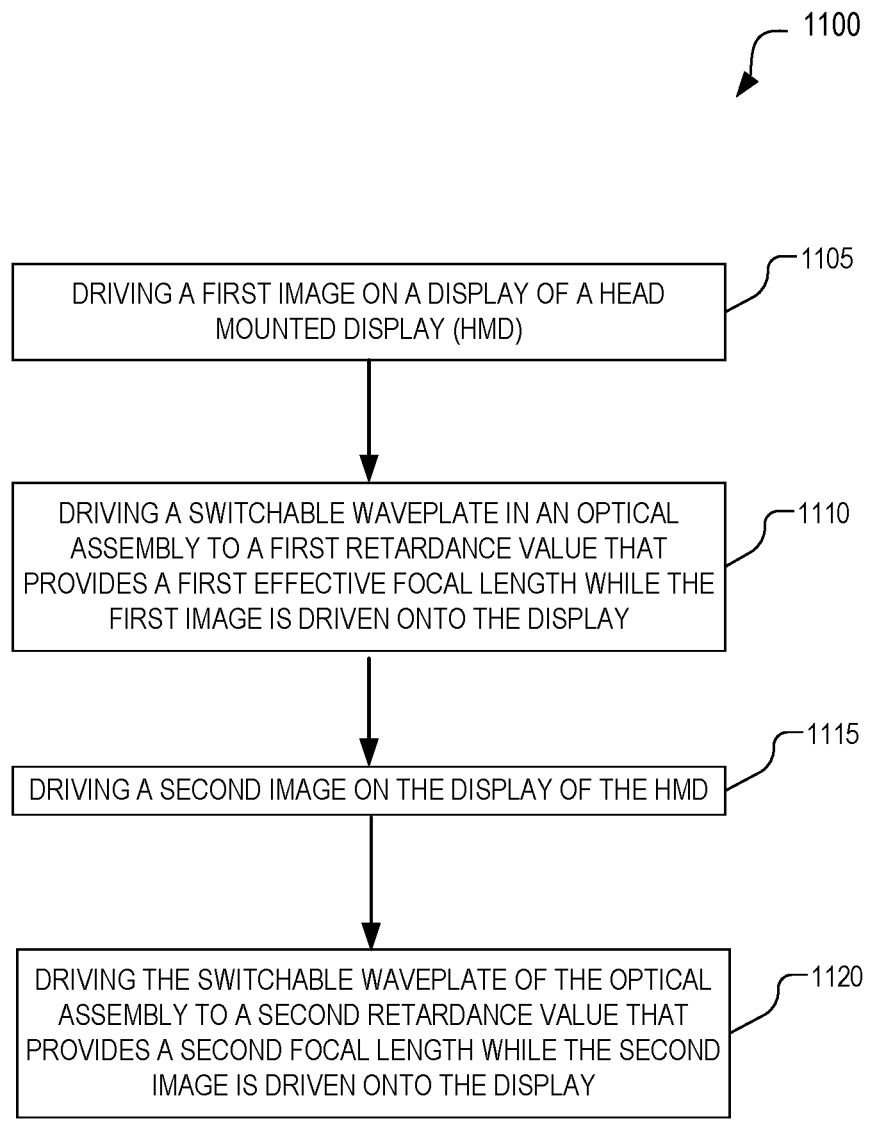
FIG. 11 illustrates a flow chart illustrating an example process of providing a time sequential combined image, in accordance with embodiments of the disclosure.

FIG. 11 illustrates a flow chart illustrating and example process 1100 of providing a time sequential combined image, in accordance with embodiments of the disclosure. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

In process block 1105, a first image (e.g. image 945) is driven onto a display of an HMD.

In process block 1110, a switchable waveplate of an optical assembly is driven to a first retardance value that provides a first effective focal length while the first image is driven onto the display. The optical assembly is positioned to focus the first image for a user of the HMD.

In process block 1115, a second image (e.g. 947) is driven onto the display of the HMD.

In process block 1120, the switchable waveplate is driven to a second retardance value that provides a second effective focal length while the second image is driven onto the display.

The first and second image may be driven onto the display at a frame rate high enough so that a user of the HMD perceives the first image and the second image as a combined image (e.g. 950).

In one embodiment, driving the second image on the display includes driving a void portion (e.g. 943) of pixels in the display to a black pixel value. The first image may be focused at the first focal length and emit display light in a viewing area corresponding to the void portion of pixels focused at the first focal length and the first effective focal length may be being longer than the second effective focal length.

Figure 12:
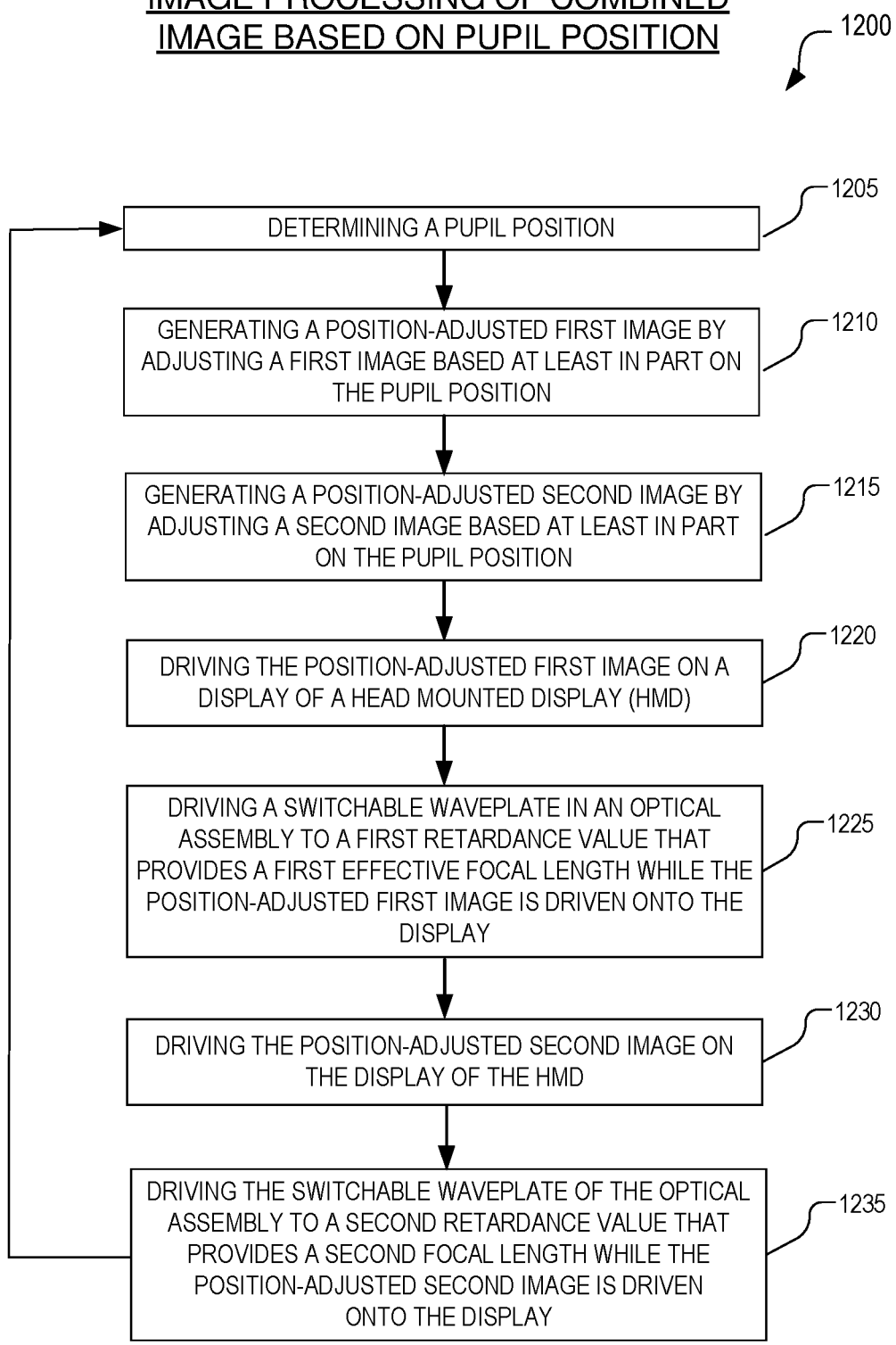
FIG. 12 illustrates a flow chart illustrating an example process of presenting a combined image in response to a pupil position, in accordance with embodiments of the disclosure.

In some embodiments, images 945 and 947 may be adjusted in response to a pupil position of an eye of a user of an HMD (HMD 100) to present a cohesive combined image 950 to the user. In an HMD with eye-tracking functionality, the location of the pupil can be used to improve the apparent blending between the inner high-resolution region of the first image 945 and the outer low-resolution region of the second image 947. FIG. 12 illustrates a flow chart illustrating an example process 1200 of presenting a combined image in response to a pupil position, in accordance with embodiments of the disclosure. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel.

In process block 1205, a pupil position of an eye of a wearer of an HMD is determined. The pupil position may be determined using eye-tracking techniques that utilize images from an eye-tracking camera that is oriented to capture images of an eye of the user, for example.

In process block 1210, a position-adjusted first image is generated by adjusting a first image (e.g. 945) based at least in part on the determined pupil position. In one embodiment, generating the position-adjusted first image includes applying distortion corrections to the first image based on the pupil position. The distortions corrections may be pre-calibrated based on calibrated measurements through a lens assembly (e.g. 330 or 730) to correct for optical misalignments associated with the pupil position. In one embodiment, generating the position-adjusted first image includes adjusting a vignetting boundary of the first image as a function of the pupil position. In some embodiments, generating the position-adjusted first image includes adjusting the distortion and the vignetting.

In process block 1215, a position-adjusted second image is generated by adjusting a second image (e.g. 947) based at least in part on the determined pupil position. In one embodiment, generating the position-adjusted second image includes applying distortion corrections to the second image based on the pupil position. The distortions corrections may be pre-calibrated based on calibrated measurements through a lens assembly (e.g. 330 or 730) to correct for optical misalignments associated with the pupil position. In one embodiment, generating the position-adjusted second image includes adjusting a vignetting boundary of the second image as a function of the pupil position. In some embodiments, generating the position-adjusted second image includes adjusting the distortion and the vignetting.

In process block 1220, the position-adjusted first image is driven onto a display of an HMD.

In process block 1225, a switchable waveplate of an optical assembly is driven to a first retardance value that provides a first effective focal length while the position-adjusted first image is driven onto the display. The optical assembly is positioned to focus the position-adjusted first image for a user of the HMD.

In process block 1230, a positioned-adjusted second image is driven onto the display of the HMD.

In process block 1235, the switchable waveplate is driven to a second retardance value that provides a second effective focal length while the position-adjusted second image is driven onto the display. After executing process block 1235, process 1200 may return to process block 1205.

The term "processing logic" (e.g. 1030 and 1031) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
a display configured to emit display light; and
an optical assembly configured to focus the display light for a user of the HMD, the optical assembly comprising:
 a switchable waveplate; and
 a reflective polarizer layer configured to pass a first polarization orientation of the display light and reflect a second polarization orientation orthogonal to the first polarization orientation, wherein the optical assembly provides a first effective focal length when the switchable waveplate is switched to a first retardance value, and wherein the optical assembly provides a second effective focal length when the switchable waveplate is switched to a second retardance value, wherein the first polarization orientation is a linear polarization orientation.

2. The HMD of claim 1, wherein the switchable waveplate is a switchable half-waveplate and the first retardance value of the switchable waveplate is 0λ, and the second retardance value is λ/2.

3. The HMD of claim 2, wherein the optical assembly further comprises:
 a quarter-waveplate; and
 a partially reflective layer disposed between the quarter-waveplate and the switchable waveplate, wherein the quarter-waveplate is disposed between the reflective polarizer layer and the partially reflective layer.

4. The HMD of claim 3, wherein the optical assembly further comprises:
 a second switchable half-waveplate;
 a second quarter-waveplate;
 a second partially reflective layer, wherein the second quarter-waveplate is disposed between second partially reflective layer and the second switchable half-waveplate;
 a third quarter-waveplate, wherein the second partially reflective layer is disposed between the third quarter-waveplate and the second quarter-waveplate; and
 a second reflective polarizer layer configured to pass the second polarization orientation and reflect the first polarization orientation, wherein the third quarter-waveplate is disposed between the second reflective polarizer layer and the second partially reflective layer, wherein the second switchable half-waveplate is configured to be switched to the first retardance value while the switchable waveplate is switched to the first retardance value, and wherein the second switchable half-waveplate is configured to be switched to the second retardance value while the second switchable half-waveplate is switched to the second retardance value.

5. The HMD of claim 4, wherein the optical assembly further comprises:
 a circular polarized disposed between the display and the switchable waveplate.

6. The HMD of claim 4, wherein the partially reflective layer has a curved surface, and wherein the second partially reflective layer has a second curved surface.

7. The HMD of claim 3, wherein the optical assembly further comprises:
 an optical element configured to receive and impart optical power to the display light of the first polarization orientation of the display light passing through the reflective polarization layer.

8. The HMD of claim 7, wherein a curved surface of a refractive material of the optical element imparts the optical power.

9. The HMD of claim 7, wherein a Fresnel surface of the optical element imparts the optical power.

10. The HMD of claim 6, wherein the optical assembly further comprises:
 an anti-narcissus layer configured to circularly polarize the display light passing through the second reflective polarizer layer.

11. The HMD of claim 3, wherein the optical assembly further comprises:
 a circular polarized disposed between the display and the switchable waveplate.

12. An optical assembly comprising:
at least one switchable waveplate;
a reflective polarizer layer configured to pass a first polarization orientation of display light and reflect a second polarization orientation orthogonal to the first polarization orientation, wherein the first polarization orientation is a linear polarization orientation; and
a partially reflective layer disposed on a curved surface, wherein the optical assembly provides a first effective focal length when the switchable waveplate is switched to a first retardance value, and wherein the optical assembly provides a second effective focal length when the switchable waveplate is switched to a second retardance value, the reflective polarizer layer reflecting the display light to the partially reflective layer when the switchable waveplate is switched to the first retardance value.

13. The optical assembly of claim 12, wherein the partially reflective layer is disposed between the reflective polarizer layer and the at least one switchable waveplate.

14. The optical assembly of claim 12, wherein the at least one switchable waveplate is a switchable half-waveplate and the first retardance value of the switchable waveplate is 0λ, and the second retardance value is λ/2.

15. The optical assembly of claim 12 further comprising:
 a quarter-waveplate, wherein the quarter-waveplate is disposed between the reflective polarizer layer and the partially reflective layer.

16. The optical assembly of claim 15 further comprising:
 an optical element configured to impart optical power to the display light that propagates through the reflective polarizer layer, the reflective polarizer layer being disposed between the optical element and the quarter-waveplate.

17. The optical assembly of claim 12, wherein the at least one switchable waveplate includes a first and second switchable waveplate, and wherein the first and second switchable waveplate are switched to the first retardance value and the second retardance value contemporaneously.

18. A method comprising:
driving a first image on a display of a head mounted display (HMD);
driving a switchable waveplate of an optical assembly to a first retardance value that provides a first effective focal length while the first image is driven onto the display, wherein the optical assembly is positioned to focus the first image for a user of the HMD, and wherein a reflective polarizer layer passes the display light of the first image when the switchable waveplate is switched to the first retardance value;
driving a second image on the display of the HMD; and
driving the switchable waveplate of the optical assembly to a second retardance value that provides a second effective focal length while the second image is driven onto the display, wherein the reflective polarizer layer reflects the display light of the second image when the switchable waveplate is switched to the second retardance value, wherein the first image has a first linear polarization orientation and the second image has a second linear polarization orientation orthogonal to the first linear polarization orientation.

19. The method of claim 18, wherein the first and second image are driven onto the display at a frame rate high enough so that a user of the HMD perceives the first image and the second image as a combined image.

20. The method of claim 19, wherein driving the second image on the display includes driving a void portion of pixels in the display to a black pixel value, and wherein the first image focused at the first effective focal length emits display light in a viewing area corresponding to the void portion of pixels focused at the second effective focal length, the first effective focal length being longer than the second effective focal length.

\* \* \* \* \*